(12) United States Patent
Noonan et al.

(10) Patent No.: US 9,402,276 B1
(45) Date of Patent: Jul. 26, 2016

(54) SYSTEM AND METHOD FOR WRIST BAND TRANSMITTER AND SYSTEM THEREOF

(71) Applicants: Joseph S. Noonan, Scituate, MA (US);
James P. Noonan, Scituate, MA (US);
Barry Nadler, Largo, FL (US); Jules Insler, Bergenfield, NJ (US)

(72) Inventors: Joseph S. Noonan, Scituate, MA (US);
James P. Noonan, Scituate, MA (US);
Barry Nadler, Largo, FL (US); Jules Insler, Bergenfield, NJ (US)

(73) Assignee: Binj Laboratories, Inc., Scituate, MA (US)

( * ) Notice: Subject to any disclaimer, the term of this patent is extended or adjusted under 35 U.S.C. 154(b) by 0 days.

(21) Appl. No.: 14/673,797

(22) Filed: Mar. 30, 2015

Related U.S. Application Data

(60) Division of application No. 12/231,437, filed on Sep. 2, 2008, now Pat. No. 9,037,098, which is a continuation-in-part of application No. 12/157,530, filed on Jun. 11, 2008, now Pat. No. 8,238,936, which is a continuation-in-part of application No. 11/457,786, filed on Jul. 14, 2006, now Pat. No. 8,078,190.

(60) Provisional application No. 60/699,281, filed on Jul. 14, 2005, provisional application No. 60/739,877, filed on Nov. 23, 2005, provisional application No. 60/933,997, filed on Jun. 11, 2007, provisional application No. 60/966,770, filed on Aug. 30, 2007.

(51) Int. Cl.
*H04W 4/00* (2009.01)
*H04W 88/02* (2009.01)

(52) U.S. Cl.
CPC ................................... *H04W 88/02* (2013.01)

(58) Field of Classification Search
CPC .... H04B 1/7183; H04B 1/71635; H04B 1/76; H04W 64/00; H04W 88/02; H04W 48/08; G01D 21/00
See application file for complete search history.

(56) References Cited

U.S. PATENT DOCUMENTS

| | | | |
|---|---|---|---|
| 4,054,754 A | 10/1977 | Nicodemus | |
| 4,638,496 A | 1/1987 | Jensen | |
| 5,440,758 A | 8/1995 | Grube | |
| 5,613,205 A | 3/1997 | Dufour | |
| 5,646,947 A * | 7/1997 | Cooper | H04J 3/0605 370/510 |
| 5,966,655 A | 10/1999 | Hardouin | |
| 6,031,490 A | 2/2000 | Forssen | |
| 6,205,189 B1 | 3/2001 | Ha | |
| 6,222,458 B1 | 4/2001 | Harris | |
| 6,343,212 B1 | 1/2002 | Weber | |
| 6,580,372 B1 | 6/2003 | Harris | |
| 6,687,506 B1 | 2/2004 | Girod | |
| 6,765,492 B2 | 7/2004 | Harris | |
| 6,907,254 B1 | 6/2005 | Westfield | |
| 7,110,774 B1 | 9/2006 | Davis | |
| 7,202,798 B2 | 4/2007 | Harris | |
| 2001/0036821 A1 | 11/2001 | Gainsboro | |
| 2002/0011119 A1 | 1/2002 | Bignell | |

(Continued)

*Primary Examiner* — Ping Hsieh
(74) *Attorney, Agent, or Firm* — Law Office of Carl Giordano, PC

(57) ABSTRACT

A light weight transmission device providing an identification signal is disclosed. In one aspect, the device comprises a gating device for controlling the transfer of information to the transmitter, a data retaining device, in communication with the gating device, receiving and storing the information for a known period of time, and a controller, in communication with the gating device, providing a signal to the gating device to enable transfer of the retained information to the transmitter at a known time and for a known period of time.

13 Claims, 10 Drawing Sheets

(56) References Cited

U.S. PATENT DOCUMENTS

| | | |
|---|---|---|
| 2002/0087062 A1 | 7/2002 | Schmit |
| 2002/0098850 A1 | 7/2002 | Akhteruzzaman |
| 2002/0098852 A1* | 7/2002 | Goren ............... G01S 1/026 455/456.3 |
| 2003/0206112 A1 | 11/2003 | Harris |
| 2004/0009778 A1 | 1/2004 | Makuta |
| 2004/0033805 A1 | 2/2004 | Verma |
| 2004/0043774 A1 | 3/2004 | Lee |
| 2004/0113755 A1 | 6/2004 | Ricci |
| 2004/0203857 A1 | 10/2004 | Wang |
| 2004/0246139 A1 | 12/2004 | Harris |
| 2006/0099968 A1 | 5/2006 | Harris |
| 2006/0105758 A1 | 5/2006 | Maislos |
| 2006/0111062 A1 | 5/2006 | Cunningham |
| 2006/0132307 A1 | 6/2006 | Velhal |
| 2006/0160045 A1 | 7/2006 | Montangero |
| 2006/0160545 A1 | 7/2006 | Goren |
| 2006/0192709 A1 | 8/2006 | Schantz |

* cited by examiner

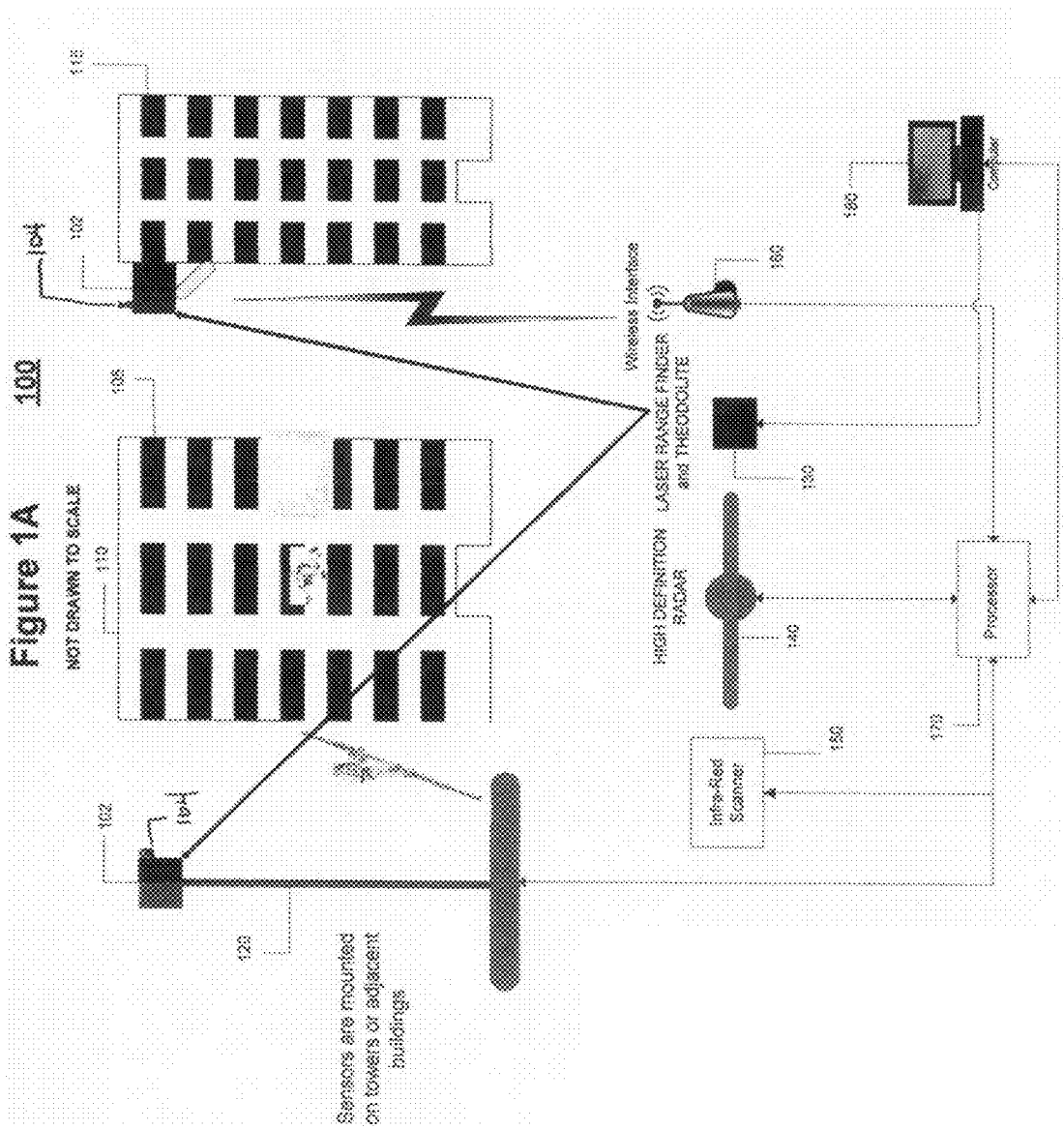

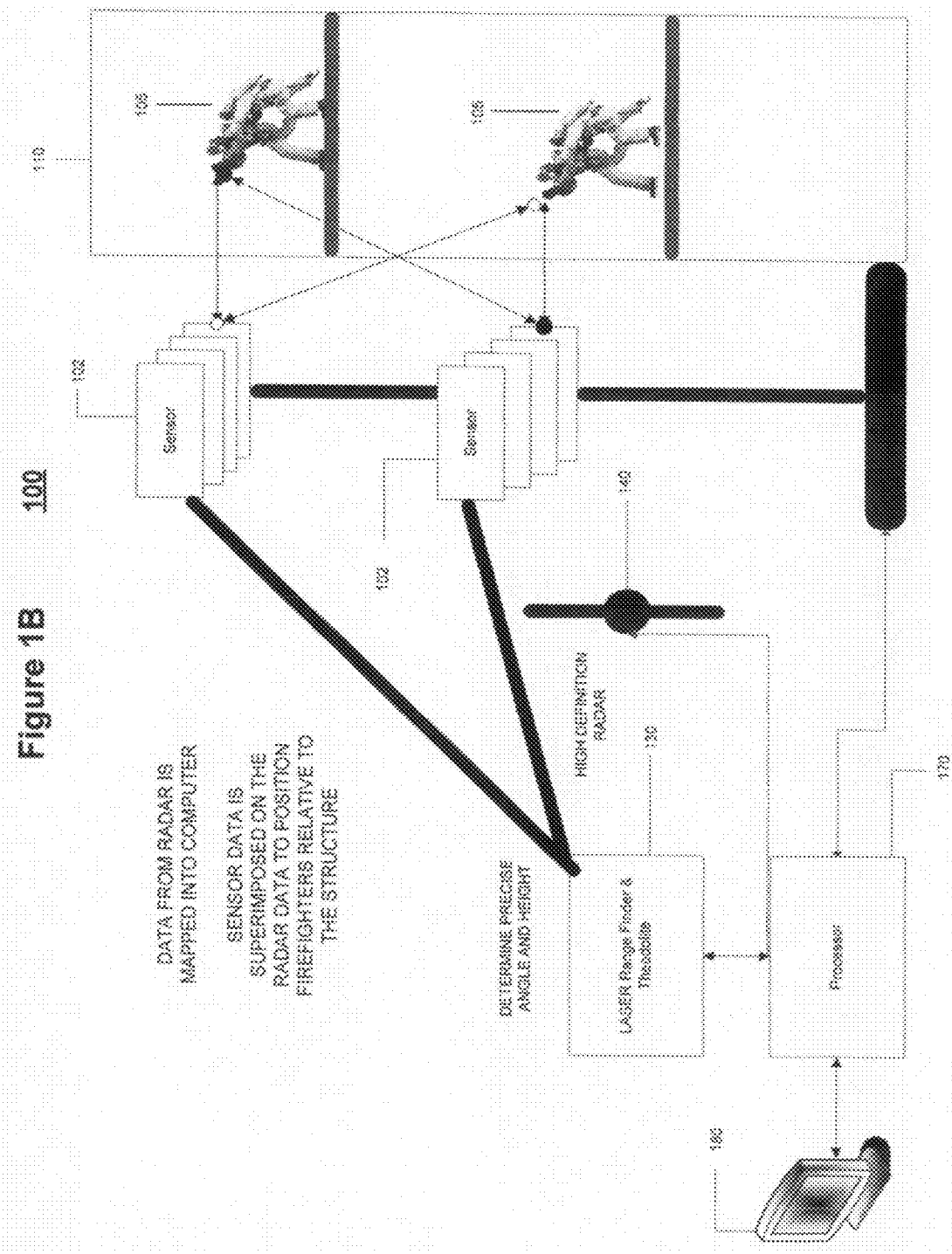

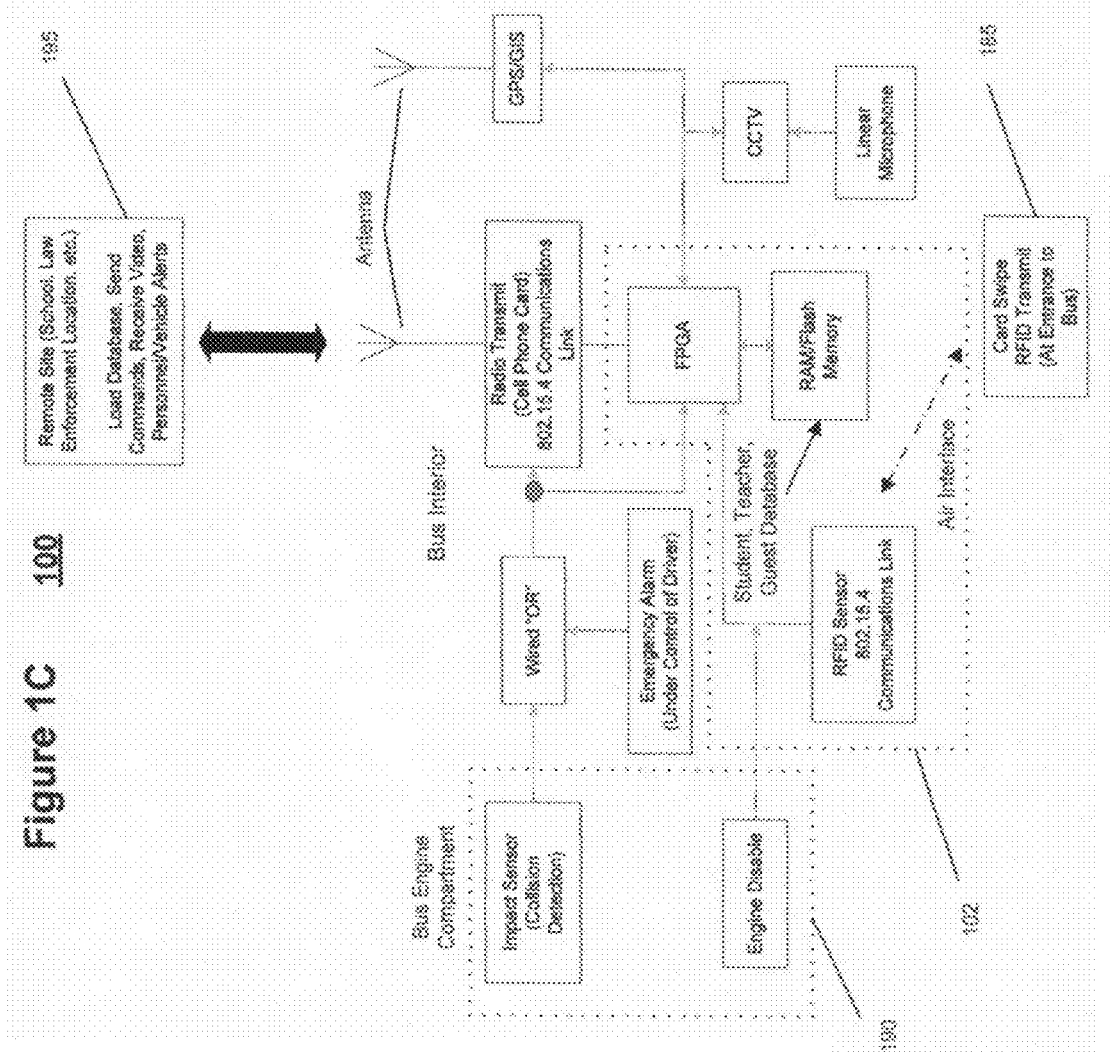

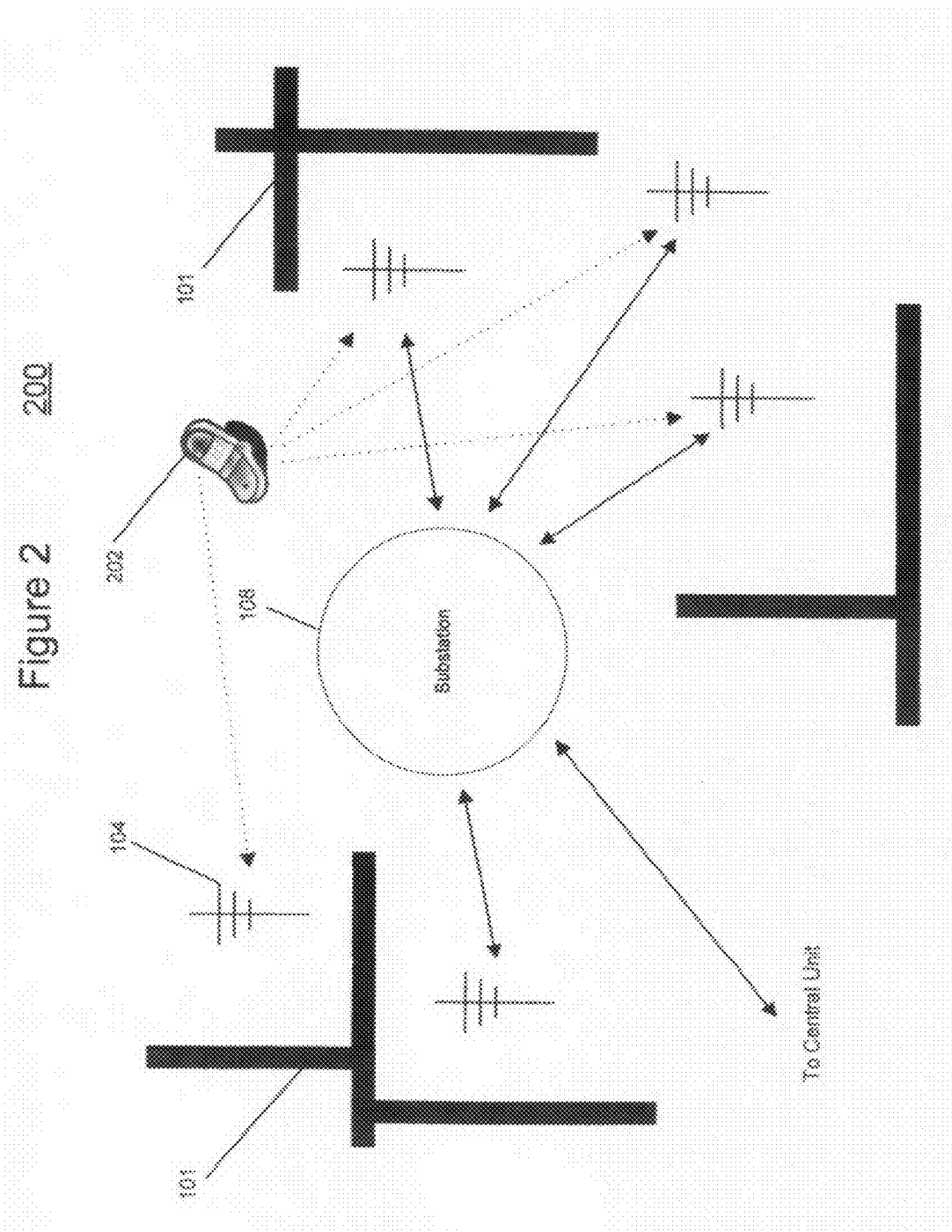

Wristband - Tracking Signal Timing

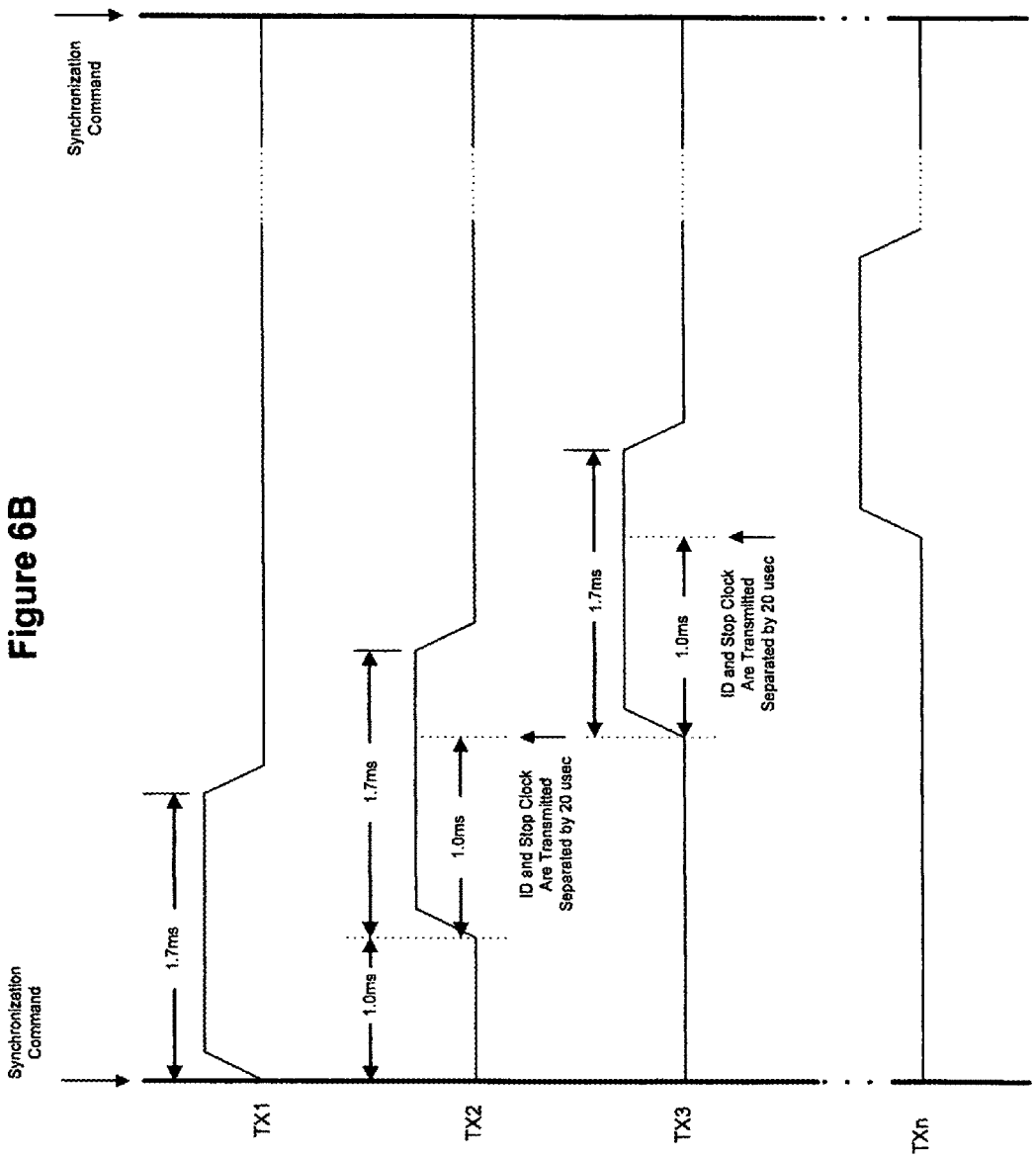

SYSTEM AND METHOD FOR WRIST BAND TRANSMITTER AND SYSTEM THEREOF

CLAIM OF PRIORITY

This application claims the benefit of the earlier filing date, pursuant to 35 USC 120, as a Divisional, to that patent application entitled "System and Method for Wrist Band Transmitter and System thereof," filed on Sep. 2, 2008 and afforded Ser. No. 12/231,437 (now U.S. Pat. No. 9,037,098), which is a continuation-in-part to that patent application entitled "Method and System for Tracking and Determining a Location of a Wireless Transmission," filed on Jun. 11, 2008, and assigned Ser. No. 12/157,530 (now U.S. Pat. No. 8,238,936), which claimed priority to Provisional Application entitled "Accuracy Tracking Methodology" filed on Jun. 11, 2007 and afforded Ser. No. 60/933,997, and further is a continuation-in-part of that patent application entitled "Systems and Methods for Detection of Transmission Facilities" filed on Jul. 14, 2006 and afforded Ser. No. 11/457,786 (now U.S. Pat. No. 8,078,190), which claimed priority, pursuant to 35 USC 119 to Provisional Patent Application entitled "Signal Tracking and Identification" filed on Nov. 23, 2005 and afforded Ser. No. 60/739,877 and to Provisional Patent Application entitled "Cell Phone Detection System" filed on Jul. 14, 2005 and afforded Ser. No. 60/699,281, and further pursuant to 35 USC 119, to Provisional Patent Application, entitled "Signal Processing Value Adds," filed on Aug. 30, 2007, and assigned Ser. No. 60/966,770, the contents of all of which are incorporated by reference herein.

FIELD OF THE INVENTION

The present invention is related to the field of wireless communication and more particularly to a method and system for tracking and determining the location of a wireless transmission.

BACKGROUND OF THE INVENTION

Conceptually, the ability to track the location of individuals within the confines of a building or other confined spaces is rather simple. The basic premise is to have a transmit device on all personnel and a centralized receiver at a control center. Though simple in concept, implementation has proven elusive. Typically, such transmit devices are radio transmitters that are worn by the user and the user may initiate communication with a push of a button (i.e., push-to-talk). However, this requires that the user must engage the transmitter button to contact the control center. To overcome this problem, the radio transmitter may, in one aspect, be an automatic mode wherein the transmitter is continuously transmitting. However, these transmitters typically operate on the same frequency and, thus, multiple transmitters continuously transmitting may interfere with each other.

Thus, a problem in locating one or more individuals within a building requires that the individuals have a method of generating one or more signals that can uniquely identify each individual and determine their location from the transmitted signals without hindering or requiring operation by the user.

Hence, there is a need for a lightweight transmitter/receiver configuration for providing unique identification of a transmitting source and monitoring, tracking and locating the transmission.

SUMMARY OF THE INVENTION

A light weight transmission device providing an identification signal is disclosed. In one aspect, the device comprises a gating device for controlling the transfer of information to the transmitter, a data retaining device, in communication with the gating device, receiving and storing the information for a known period of time, and a controller, in communication with the gating device, providing a signal to the gating device to enable transfer of the retained information to the transmitter at a known time and for a known period of time.

BRIEF DESCRIPTION OF THE DRAWINGS

For a better understanding of the invention, reference is now made to the drawings wherein:

FIGS. 1A-1C illustrate typical environmental situations requiring a lightweight transmitter/receiver;

FIG. 2 illustrates one section of a detecting, tracking and locating system in accordance with the principles of the invention;

FIG. 6B illustrates a timing diagram of an exemplary transmitting protocol of a plurality of transmitting devices in accordance with the principles of the invention;

Figure 3:
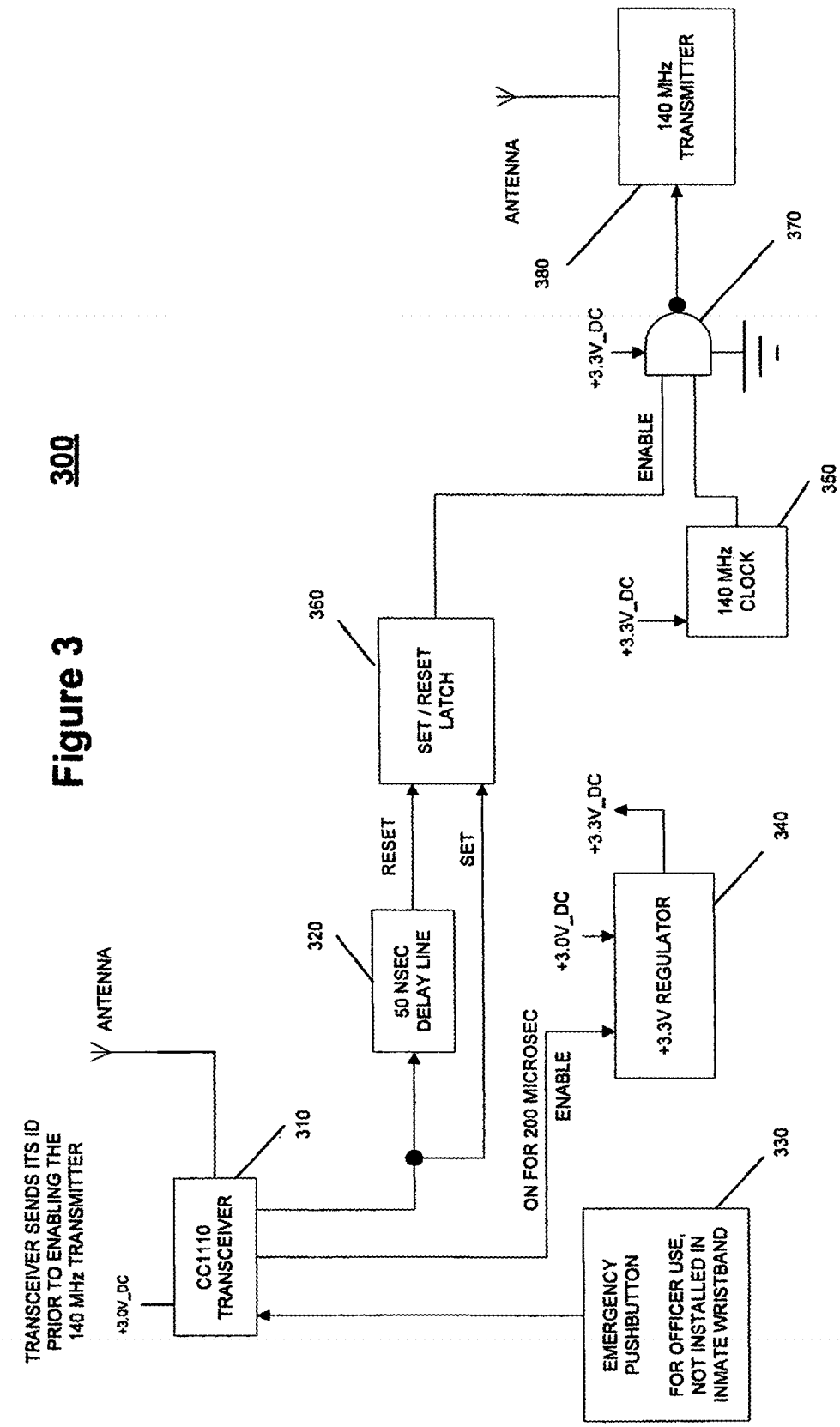
FIG. 3 illustrates a block diagram of a first exemplary transmitting device in accordance with the principle of the invention.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION OF THE INVENTION

FIG. 1A illustrates an exemplary application of identifying, monitoring, tracking and locating a fire fighter 105 located in building 110 in a fire fighting situation, wherein each fire-fighter has a wrist band, in accordance with the principles of the invention. In this illustrated exemplary application, one or more sensors 102 may be located on building 115 or a tower 120 adjacent to the building 110. In one aspect of the invention, the location of the sensors may be built into command vehicles, wherein, the sensors may be placed in a configuration that provides for best determining location of the firefighter. The fire fighter 105 may have on his/her person a wireless transmission device, e.g., a cell phone or a special purpose device. The special purpose device may be a transceiving device (wireless device) that may be attached to a wrist (a wrist band), pinned to a garment or attached around a neck (a badge). The wireless transmission device may further provide emergency notification capability (i.e., alarm alert, panic button, audio communication capability, biometric information, altitude and attitude indication). The wireless transmission device may be pre-loaded with an identification code or the identification code may be dynamically assigned and downloaded to the wireless transmitting device at the moment the device is needed. Thus, the location of each of the firefighters 105 may then be monitored, tracked and located as previously disclosed as the sensors 102 provide identification of firefighter 105 via a wireless communication link to wireless interface 160. Computer 180 may then correlate the information from each of the sensors to determine a location of firefighter 105.

Although the principles of the invention are applicable to the illustrated example, it would be recognized that in this dynamic situation, the location of the sensors are not determined a priori nor is the general configuration of the building 110 known. Hence, to provide proper location of firefighter 105 locations of sensors 102 and associated antenna 104 and a general layout of the building 110 is needed. To determine the location of the sensors 102, a laser range finder and theodolite 130 may be used, for example. The theodolite 130 may determine the position, both horizontal and vertical of the sensors 102 with respect to the position of the theodolite. The position of the theodolite 130 may be determined based on a GPS (Global Positioning Satellite) system. In one aspect, the sensors 102 may also include a GPS receiver (not shown), which may provide the location of the sensor 102. The location of sensor 102 may then be transmitted via a wireless communication link to interface 160. The location may then be provided to computer 180. In another aspect, electronic copies of the building structure 110 may be provided to computer 180 or, as illustrated, a high definition RADAR 140 may be used to map the interior elements of building 110. This mapping may be performed periodically to account for changes in the structure of building 110. The information from the RADAR 140 may be provided to a processor 170 that correlates the location of firefighter 105 with the current structure of building 110. It would be recognized that such correlation may be performed in computer 180 also. In another aspect, an infra-red scanner 150 may be incorporated to determine the location of hot spots within building 110. In this illustrated system 100, computer 180 may for example, direct a firefighter 105 toward or away from hot spots depending upon the situation that is occurring within building 110.

FIG. 1B illustrates another exemplary application of the system described herein. In this exemplary application, multiple sensors 102 are positioned vertically on tower 120 to provide accurate location of each of the firefighters on different levels within building 110. Computer system 180, as previously discussed, may correlate the interior structure of each floor of building 110 to accurately locate the position of firefighter 105.

FIG. 1C illustrates another exemplary application of the system described herein. In this exemplary application, sensor 102 may be included on a school bus, for example, wherein each student is allocated a badge 185 that is detected upon the student's entry to the bus. The identification and status of each person (student, parent, driver) may then be provided to central office 195 that maintains a register of the persons on the school bus. In the case of an accident, for example, information regarding the bus may be determined by collision or impact sensor 190 and provided to the central office 195. The central office having a registration of the persons on the bus may then provide information to parents, school officials, and police. In this aspect of the invention, the bus itself may include a long-range wireless transmitting device (previously discussed) or transmission facility (as earlier discussed for outside applications) or a GPS system (not shown) that determines the location of the bus.

Although aspects of the invention have been shown with regard to a firefighter situation, it would be recognized that the invention claimed is also applicable in the fields of corrections, law enforcement and in society, in general, and have been contemplated and considered to be within the scope of the claims recited herein.

FIG. 2 illustrates an exemplary section of an environment wherein a lightweight, substation (or sensing device) 108 operates as an independent detection unit. One embodiment of the transmission detection, identification, and reporting system 100 may involve the detection of a lightweight transmission device (e.g., the illustrated mobile phone, or wrist band) 202 within a walled facility 102. In one example, the facility may be a heavily walled and metal-barred government facility such as a correctional facility. The system may utilize an array of antennas 104 selectively placed within the facility, a collection substation 108 for localized collection of detected signals, a central unit (not shown) for the processing of incoming signals from the facility, a display (not shown) for showing the location of the detected lightweight transmitter 202, and an action facility (not shown) for implementing standard procedures in the event of a detection. In this embodiment, the communications between the antennas 104 and the substations 108, and between the substations 108 and the central unit (not shown), may be wireless to make installation and maintenance of the system within the facility cost and time effective. Selective placement of the antennas 104, combined with algorithms and methods for determining location of the lightweight transmission device 202, may allow a substantially improved means for locating device 202 in an otherwise heavily shielded environment.

In this case, the sensors may perform multiple functions, as they may communicate both in a wired and wireless mode. The communications may be setup to work in a Wide Area Network (WAN) or a closed loop network, with known wireless protocols and access points. The sensors can detect multiple wireless transmissions, including those from conventional cell phone, wrist bands, badges and other lightweight transmission facility units. Referring to wrist bands, as the lightweight transmission device, the wrist bands can pass and receive audio, biometric, video, data and information to and from the sensors, and receive wireless communication and data/information from other wristbands and pass information and receive information to at least one third party application or device. The wrist bands transmission capability includes synchronized transceiver communication, and a pico-second rise-time transmission circuit, and a battery conservation circuit. The wristband may include at least one third party application or device and incorporates biometric, identification, alarm and alert functionality and circuitry. The sensors can also pass audio and video to a central unit, or receive wireless communication from each other sensor and pass that information to at least one third party application or device. Additionally, the central unit may accept data from the third party network and pass the data to the sensors to be broadcast out each node. An embodiment of the system is to provide communication to each cell wherein a user can receive and transmit audio, video, data, and phone services. The sensors may also be designed to connect to smoke detectors and other alarm detection devices, for example.

The embodiment of the wrist band and central unit are designed to collect data on at least a portion of the wireless transmissions including time, status, biometric, environmental and location and the like. The embodiment of the system may dissect this information to make better decisions regarding the environment within the range of the sensors. In this case, conditions such as heart attack detection, suicide prevention, stress analysis may be detected and provided to a central office.

FIG. 3 illustrates a block diagram of a first exemplary embodiment of a lightweight transmitter system (referred to herein as wristband) 300, in accordance with the principles of the invention. In this illustrated embodiment of the invention, wherein a 140 MHz transmitter 380 operates to output information through antenna 390. The information transmitted by transmitter 380 may be detected by one or more receiving antenna 104 (FIG. 2) and provided to substation 108 (FIG. 2). Transmitter 380 provides transmission at a known time as controlled by clock 350. As illustrated, information from the wrist band (e.g., identification code, biometric, etc.), provided by latch 360 and is gated through AND gate 370 with the controlling output of clock 350. Hence, transmitter 380 outputs information in synchronization with the controlling output of clock 350. As would be recognized, latch 360 represents a means for retaining information for a known period of time. In this illustrated case, latch 360 may represent a well-known flip-flop circuit(s) that retains one or more data bit values. Latch 360 may also represent a shift register that retains information regarding a plurality of data bit values or a memory.

In one aspect of the invention, wrist band system 300 may include a receiving system 310 that may receive information from antenna 104 (FIG. 2). Information, such as identification number, or a polling signal may be provided and received through receiver 310. For example, in response to a polling signal, wrist band system 300 may delay the poll signal by delay line (or timing controller) 320 and then latch the poll signal in latch 360. Thus, at the next tick of clock 350, the state of latch 360 may then be transmitted via transmitter 380. In this exemplary example, wrist band system 300 may operate in an interactive mode with regard to substation 108 (FIG. 2). In one aspect, the delay line 320 may be programmed so that each device provides information or data to latch 320 at a different time. In another aspect, a phase of clock 350 may be altered so that the output of the clock value may occur at different times after the polling signal.

Also illustrated is optional emergency indicator 330 that may be used to provide a signal that is transmitted during a next clock pulse. In this case, the emergency signal operates in a manner similar to the poll signal and is latched in latch 360. Although not shown, it would be recognized that the state of latch 360 is reset after transmission of one or more transmissions of the latched state of latch 360. Also shown is regulator 340, which provides a relatively constant voltage to the operation of system 300. In one aspect of the invention, to conserve power, the regulator 340 may be operated for a known time period. This time period, as will be explained, may be set for a fixed time period and at a fixed period within a larger frame period.

Figure 4:
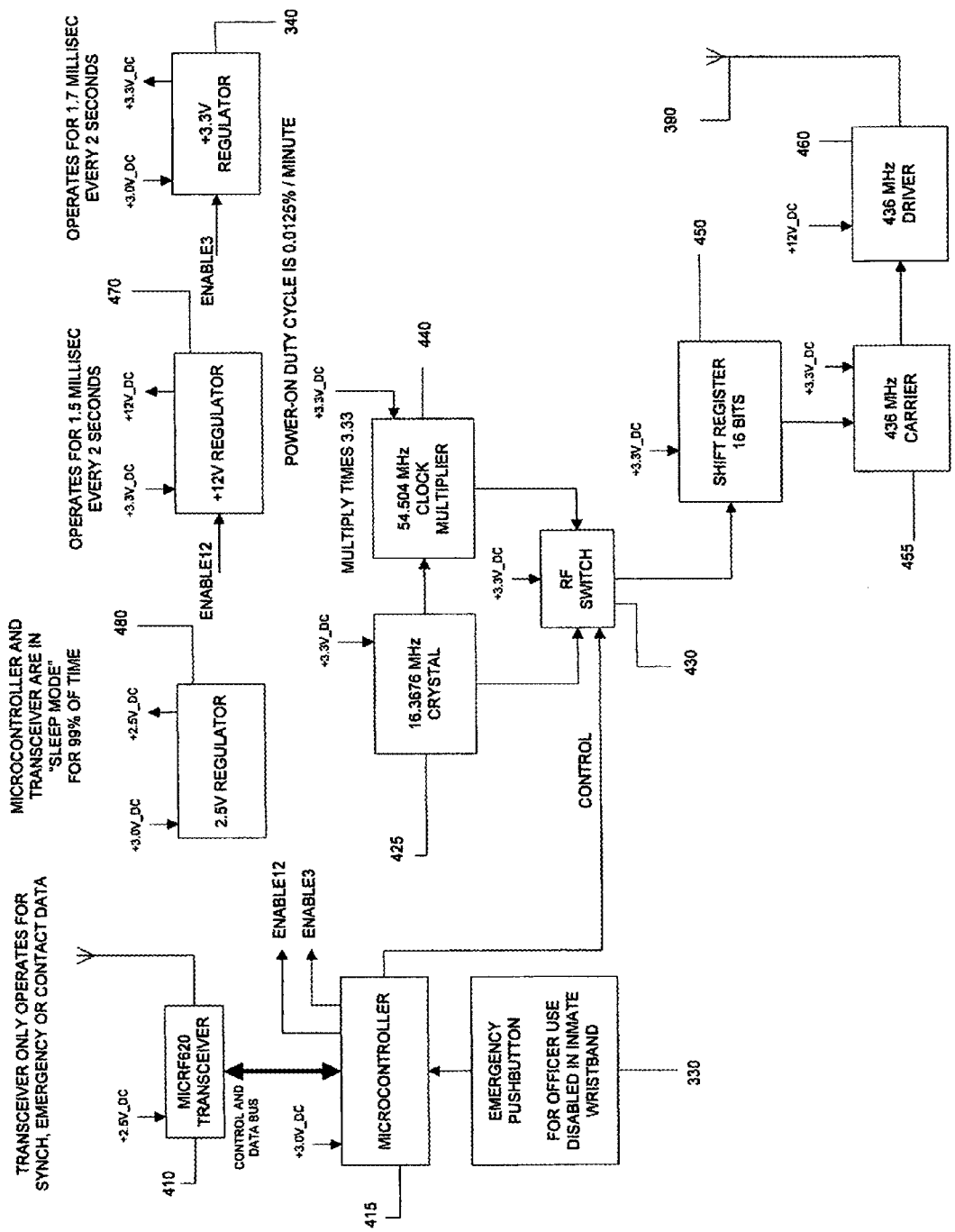
FIG. 4 illustrates a block diagram of second exemplary transmitting device in accordance with the principles of the invention.

FIG. 4 illustrates a block diagram of a second exemplary embodiment of a lightweight transmitter system (referred to herein as wristband), in accordance with the principles of the invention. In this illustrated embodiment of the invention, receiver 410 may, in addition to the synchronization signal discussed in FIG. 3, may also receive an identification signal or code. For example, the identification code uniquely defines the wrist band transmission received by substation 108 (FIG. 2). In this case, microcontroller 415 may store the identification signal or code in a memory (not shown). The microcontroller may then provide the identification code, in response to a synchronization signal, to shift register 450 for subsequent transmission by transmitter 455 and driver 460 via antenna 390. In this illustrated case, transmitter 455 and driver 460 are shown as operating at 436 Mhz. It would be recognized that this value is chosen merely for illustrating the principles of the invention and that the invention claimed is not limited to this frequency of transmission. Rather the frequency of transmission is adapted dependent upon transmission regulations and types of transmission devices selected.

Microcontroller 415 further provides control signals to RF switch 430, which determines whether signals are provided from clock 425 or multiplier 440 provided to shift register 450. In this illustrative example, microcontroller 415 provides the control function of forming the output signal (e.g., identification code, biometric data) that is output via antenna 390. Although not shown, it would be recognized that the data output may also include a preamble signal that may be used to determine a transmission/receive time with respect to one or more antenna 104 (FIG. 2). Such information may be used to determine a location of the lightweight transmission device by the substation 108 (FIG. 2).

Also illustrated are various voltage regulators 340, 470 and 480, that may be used to provide a substantially consistent voltage to the components of wrist band 400. In one aspect of the invention, regulator 340 (represented as a 3.3 volt regulator) may be used to initiate a start-up mode), regulator 470 (represented as a 12 volt regulator) may be used to power the components) and regulator 480 (represented as a 2.5 volt regulator) may be use to provide power to a low voltage, low current, transceiver. In addition, and as previously described, the wrist band system 400 may be operated only for a fixed period of time during a specific period within a frame time. This is desirable to conserve battery power (not shown), in the case of a battery operated device.

Emergency pushbutton 330, in this case, provides a signal to microcontroller 415, to provide an immediate signal to be output, as previously discussed. In one aspect, the emergency pushbutton 330 may be connected to an interrupt bus of microcontroller 415 which provides an interrupting signal to microcontroller 415, when pushed. In another aspect, microcontroller 415 may poll a line connected to pushbutton 330 at a known rate. When pushbutton 330 is engaged, a signal may be detected by the polling mechanism.

Figure 5:
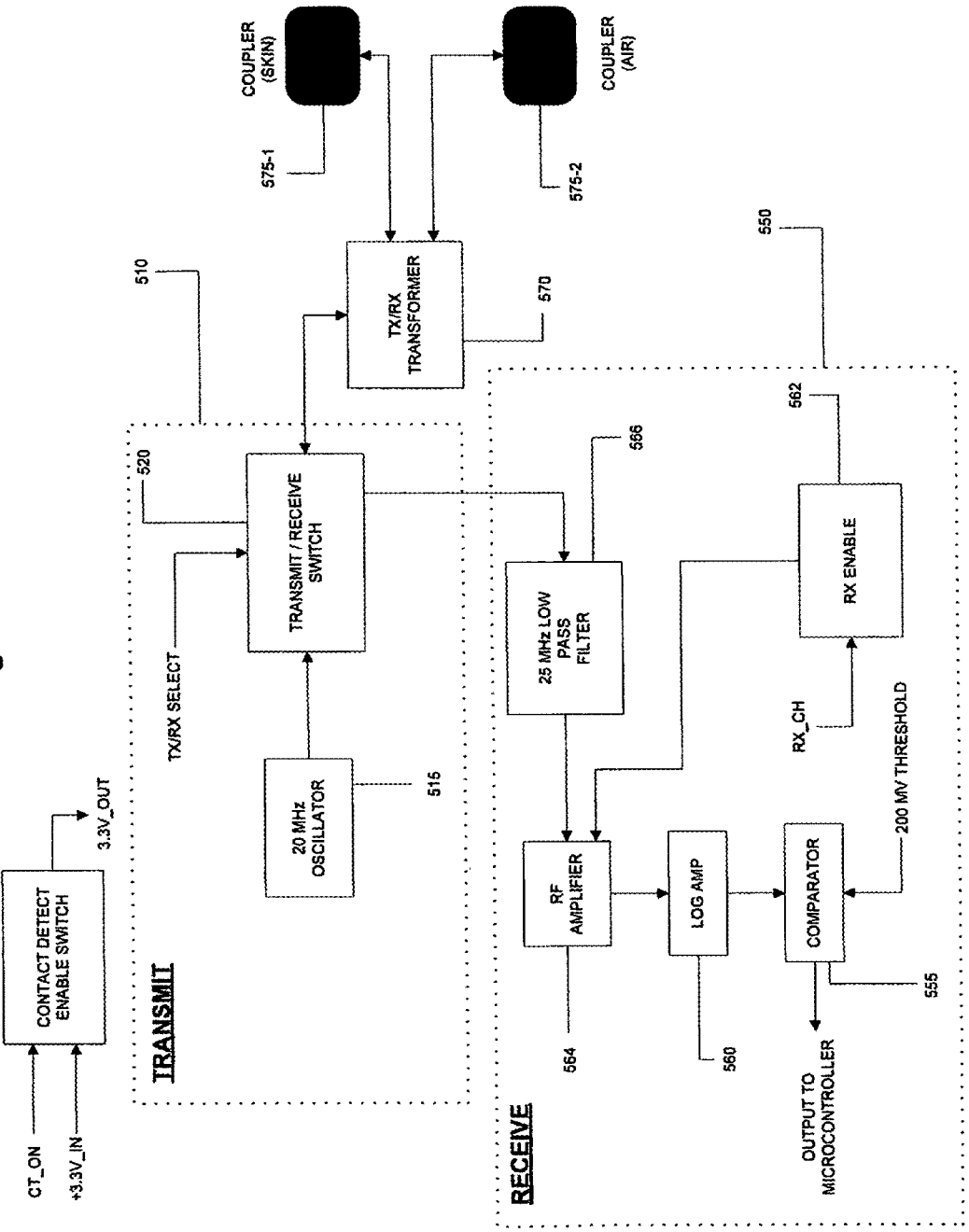
FIG. 5 illustrates a block diagram of a third exemplary transmitting device in accordance with the principles of the invention.

FIG. 5 illustrates a block diagram of another exemplary embodiment of a lightweight transmitter system (referred to herein as wristband), further including a contact sensor in accordance with the principles of the invention. The contact sensor is applicable in determining when two wristbands, shown in FIG. 4, come into close proximity to each other. In this illustrated embodiment of the invention, when a first wristband (not shown) detects the presence of a second wristband (not shown), the received signal is coupled through coupler 575 and passed to transformer 570. A low pass filter 566 is used to prevent unwanted signals from falsely triggering comparator 566. A switch 562 is used to enable power to the RF Amplifier 564. The signal is then passed to a Logarithmic Amplifier 560 where it is detected and amplified. The signal passes to the comparator 555 where, if it is greater than a preset threshold, an indication is sent to a processor (not shown) to determine the amount of time the indication is active. In one aspect of the invention, the indication may be represented as a single bit. In another aspect, the first wristband may also transmit a signal to be detected by a second wristband. For example, a 20 MHz oscillator 515 is passed through a transmit/receive switch 520 and then to a transformer 570. The signal for the oscillator 515 is then passed to coupler 575 and onto the wristband wearer's skin. Each wristband transmitter 510 may thus produce a unique signature based on the wristband and characteristics of the user. Thus, in this aspect, the system may uniquely identify each wristband, and, thus, the wearer. Thus, a limited powered processor in the wristband would not be tasked to perform identification, but rather would pass the unique identifier to either a sensor (not shown) or a computer (not shown) where a database of wristbands would be stored.

In another aspect of the invention, the wrist band system may measure a pulse or heart rate and provide this information to microcontroller (not shown) The microcontroller may maintain a history of pulse or heart rate over a known period of time to establish a nominal pulse or heart rate. The microcontroller may then perform one or more different types of analysis in order to determine biometric characteristics of a user. In one aspect, when the determined biometric characteristics are outside known tolerance levels, an emergency signal, similar to that of execution of pushbutton 330, may be initiated. As would be recognized, the tolerance levels may be set a priori or may be determined based on the determined nominal biometric characteristics of the user. In this manner, the tolerance levels may be uniquely established as a function of the biometric characteristics of the user.

Figure 6A:
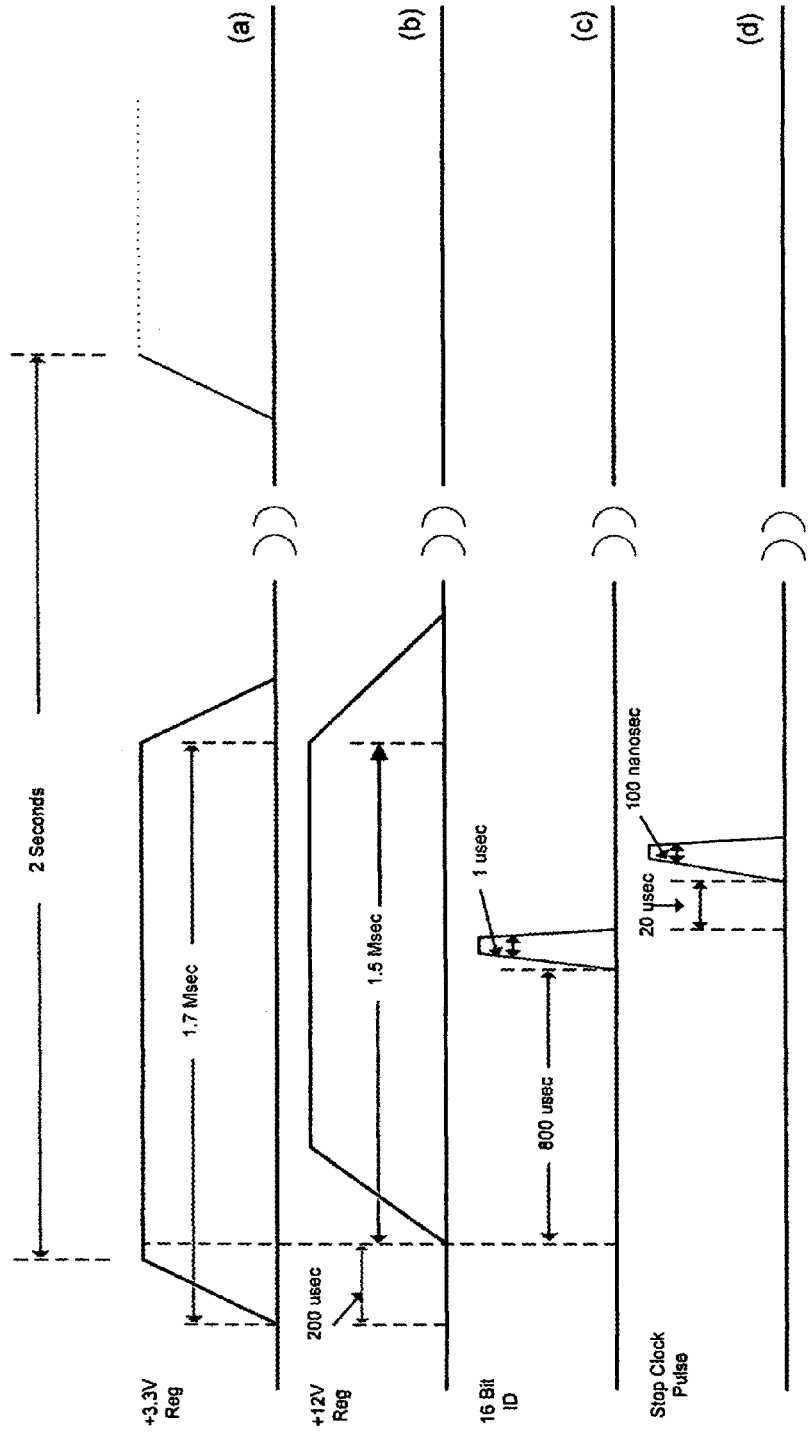
FIG. 6A illustrates a timing diagram of an exemplary transmitting protocol of a single transmitting device in accordance with the principles of the invention.

FIG. 6A illustrates a timing diagram of an exemplary protocol in accordance with a single lightweight transmission device in accordance with the principles of the invention. In this illustrated protocol, which is comparable to a personnel tracking mode, a frame of a period of two (2) seconds is established within which time all lightweight transmitters, within the system, shown in FIG. 2, for example, are required to respond to a synchronization command. Accordingly, in one aspect of the invention, each wristband remains in a "sleep" mode and times a two second period. When the two second period has been reached, appropriate voltages, from the illustrated regulators, are applied to the components to activate or "wake up" the lightweight transmission device. Referring to FIG. 6A(a), a start-up regulator (e.g., 3.3 volt regulator 340) "wakes up" for a period of time of 1.7 milliseconds (ms), within the designated frame time (two seconds). A wait state of 200 microseconds is then timed to allow the regulator to achieve a stabilized voltage level before turning on a second regulator (e.g., 12 volt regulator 470). FIG. 6A(b) illustrates the incorporation of a 200 microsecond period, after the first regulator 340 provides an initial power. Power is thus provided by the second regulator for a total of 1.5 ms.

An additional delay of 800 microseconds after the powering-on of the second regulator or 1 ms after the initial wake-up indication, is invoked before an output occurs. During this additional delay time, an identification value or code of the wristband is entered into shift register 450 (FIG. 4). At the end of the 800 microsecond delay, processor 415 shifts the identification code to the modulator (e.g., 455) for subsequent output. In a preferred embodiment, the output is performed for a period of 1 microsecond (see FIG. 6A(c)). Utilizing a preferred transmission of sixty-one (61) nanosecond pulses a 16 bit identification code may be transmitted within 976 nanoseconds. At the completion of the 1 microsecond transmission, an additional delay of 20 microseconds is invoked, after which a stop pulse is transmitted (see FIG. 6A(d)). The stop pulse, in a preferred embodiment represents a 100 nanosecond pulse without modulation. As would be appreciated, during the 20 microsecond delay, additional data associated with the user, e.g., biometric data, may be transmitted.

Although, the lightweight transmitter is operable for a period of 1.7 millisecond, in accordance with the exemplary timing described herein, transmission is completed within 1.1 milliseconds after the initial wake-up signal. As a system of lightweight transmitters described herein are operated in a time-division transmission protocol, each transmitter may be assigned a transmission period that provides an overlap in time to maximize the number of transmitters within a frame. FIG. 6B illustrates a timing diagram for the management of a plurality of transmissions within a frame period. As illustrated, the transmission of the identification (at 1 millisecond after turn-on) and the stop pulse 20 microseconds thereafter, allows for the overlap, in time of the transmission from individual transmitters. For example, with the illustrated spacing of 1 millisecond described herein up to two thousand (2000) individual transmitters may be accommodated within the described frame.

Although the lightweight transmission device and system thereof has been described with regard to a specific timing protocol (FIGS. 6A, 6B), it would be recognized that the specific values provided herein are only for purposes of illustration and do not represent the only timing contemplated by the inventors at the time of the invention. Rather, each of the periods of transmission, the pulse transmission value and the frame period may be altered without undue experimentation to accommodate different and desired conditions. For example, it would be appreciated that one or more devices may be programmed to transmit at a rate greater than once per frame, as has been described herein, when an emergency condition is detected. This increase in transmission rate may be directed by the substation 108 (FIG. 2) upon reception of an emergency signal. In which case, the substation may provide instruction to the wristband transmitter to alter the known time to transmit.

In one aspect of the invention, the timing within a frame may be established by the substation 108 (FIG. 2) after an evaluation of all the transmitters within the environment. In another aspect of the invention, each transmitter may include a predetermined delay within a frame to be activated. In this case, substation 108 may use an identification code to distinguish signals from transmitters having the same time of transmission.

Figure 7:
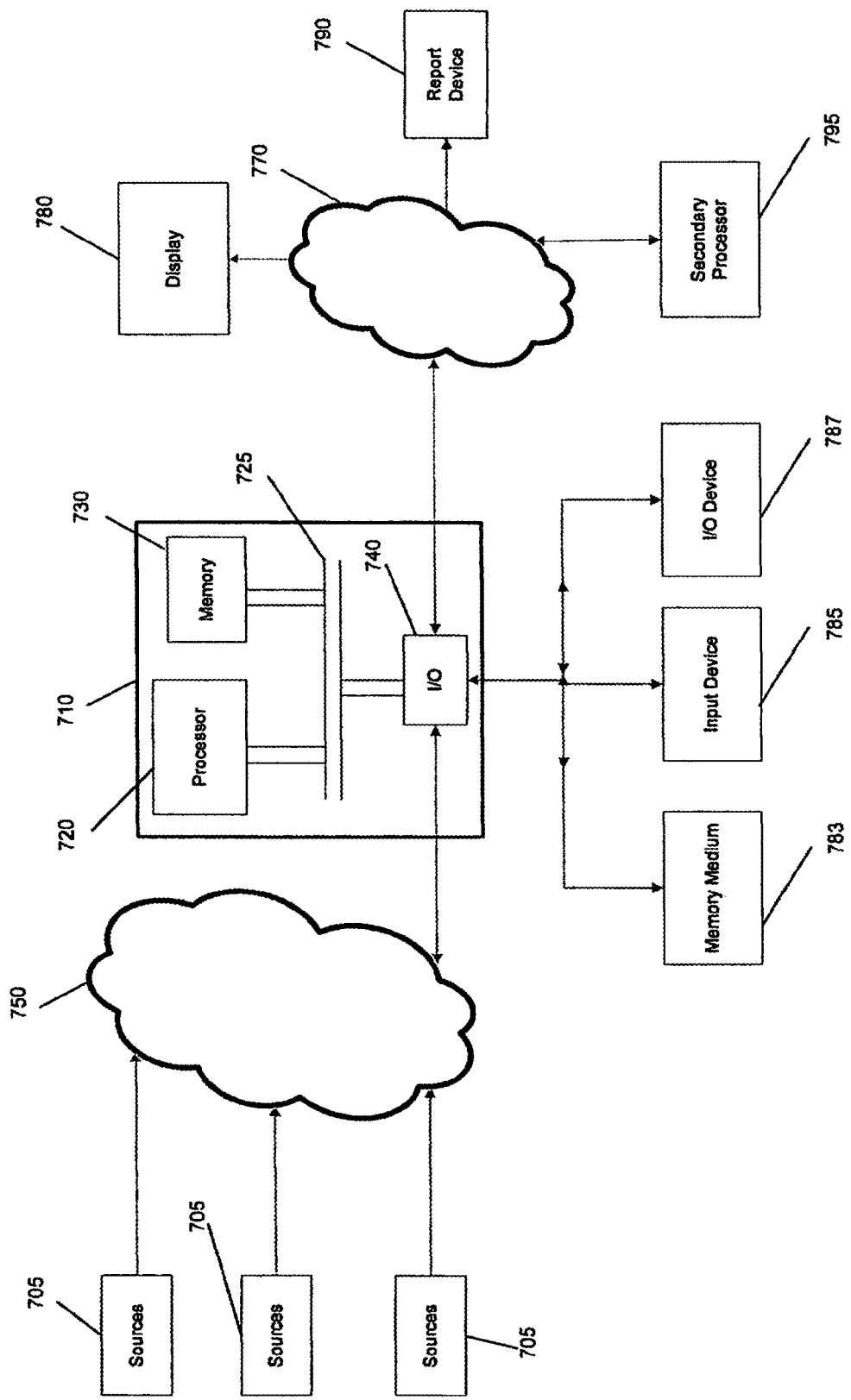
FIG. 7 illustrates a system for implementing the system and/or apparatus in accordance with the principles of the invention.

FIG. 7 illustrates a system 700 for implementing the principles of the invention shown herein. In this exemplary system embodiment 700, input data is received from sources 705 over network 750 and is processed in accordance with one or more programs, either software or firmware, executed by processing system 710. The results of processing system 710 may then be transmitted over network 770 for viewing on display 780, reporting device 790 and/or a second processing system 795.

Processing system 710 includes one or more input/output devices 740 that receive data from the illustrated sources or devices 705 over network 750. The received data is then applied to processor 720, which is in communication with input/output device 740 and memory 730. Input/output devices 740, processor 720 and memory 730 may communicate over a communication medium 725. Communication medium 725 may represent a communication network, e.g., ISA, PCI, PCMCIA bus, one or more internal connections of a circuit, circuit card or other device, as well as portions and combinations of these and other communication media.

Processing system 710 and/or processor 720 may be representative of a handheld calculator, special purpose or general purpose processing system, desktop computer, laptop computer, palm computer, or personal digital assistant (PDA) device, etc., as well as portions or combinations of these and other devices that can perform the operations illustrated.

Processor 720 may be a central processing unit (CPU) or dedicated hardware/software, such as a PAL, ASIC, FGPA, operable to execute computer instruction code or a combination of code and logical operations. In one embodiment, processor 720 may include code which, when executed by the processor, performs the operations illustrated herein. The code may be contained in memory 730, may be read or downloaded from a memory medium such as a CD-ROM or floppy disk, represented as 783, may be provided by a manual input device 785, such as a keyboard or a keypad entry, or may be read from a magnetic or optical medium (not shown) or via a second I/O device 787 when needed. Information items provided by devices 783, 785, 787 may be accessible to processor 720 through input/output device 740, as shown. Further, the data received by input/output device 740 may be immediately accessible by processor 720 or may be stored in memory 730. Processor 720 may further provide the results of the processing to display 780, recording device 790 or a second processing unit 795.

As one skilled in the art would recognize, the terms processor, processing system, computer or computer system may represent one or more processing units in communication with one or more memory units and other devices, e.g., peripherals, connected electronically to and communicating with the at least one processing unit. Furthermore, the devices illustrated may be electronically connected to the one or more processing units via internal busses, e.g., serial, parallel, ISA bus, Micro Channel bus, PCI bus, PCMCIA bus, USB, etc., or one or more internal connections of a circuit, circuit card or other device, as well as portions and combinations of these and other communication media, or an external network, e.g., the Internet and Intranet. In other embodiments, hardware circuitry may be used in place of, or in combination with, software instructions to implement the invention. For example, the elements illustrated herein may also be implemented as discrete hardware elements or may be integrated into a single unit.

As would be understood, the operations illustrated may be performed sequentially or in parallel using different processors to determine specific values. Processing system 710 may also be in two-way communication with each of the sources 705. Processing system 710 may further receive or transmit data over one or more network connections from a server or servers over, e.g., a global computer communications network such as the Internet, Intranet, a wide area network (WAN), a metropolitan area network (MAN), a local area network (LAN), a terrestrial broadcast system, a cable network, a satellite network, a wireless network, or a telephone network (POTS), as well as portions or combinations of these and other types of networks. As will be appreciated, networks 750 and 770 may also be internal networks or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. For example, while the device described herein is referred to as a transmitting device, it would be recognized by those skilled in the art that the device may incorporate a receiving unit, designed to operate in one or more frequency bands over a wide frequency range. For example, the receiving system may represent a crystal receiving system that may detect one or more signals within a frequency range, or may represent a superhetrodyne receiver that may detect and determine the frequency of operation of received signals.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A device comprising:
    a transmitter configured to transmit data provided thereto; and
    a microcontroller in communication with a memory, said memory including code which when accessed by said processor causes said processor to execute the steps of:
        generating an indication of operational status a first known period of time after activation of the device, said activation being for a predetermined activation time;
        delaying operation after generating the indication of operational status, the operation being delayed by a predetermined delay period after the indication of operational status;
        providing, to said transmitter, a plurality of bits at a predetermined bit rate for a known period of time, and at least one unmodulated bit, wherein said at least one unmodulated bit is provided to said transmitter a fixed period after a last of said plurality of bits is provided to the transmitter; and
        returning to a deactivate state after expiration of the activation time.

2. The device of claim 1, wherein said first known period of time is preloaded in said memory.

3. The device of claim 1 further comprising:
    a receiving system in communication with said microcontroller.

4. The device of claim 3, said receiving system receiving a known reference point signal.

5. The device of claim 3, the receiving system receiving an offset value.

6. The device of claim 5, wherein activation of the device is determined based on the offset value with respect to the reference value.

7. The device of claim 3, said receiving system receiving the predetermined delay period.

8. The device of claim 1, wherein the microcontroller further:
    providing to the transmitter during the fixed period additional data.

9. The device of claim 1, wherein the additional data comprising biometric data.

10. The device of claim 1, wherein the microcontroller further:
    providing to the transmitter an emergency indication.

11. The device of claim 1, wherein the first known period is determined in hardware.

12. The device of claim 1, wherein the predetermined delay period is preloaded in the memory.

13. A system for managing a plurality of wireless devices, the system comprising:
    a transceiving system configure to transmit and receive;
    a processor configured to:

access code within a memory; and execute the code, wherein the code causes the processor to:
- have transmitted to each of the plurality of wireless devices, a reference signal common to each of the wireless devices and an offset time, with respect to the reference signal, selected for a corresponding one of the wireless devices;
- wherein the offset time represents a time that a corresponding wireless device is activated and causes an overlap in time of the activation of at least two of the wireless device; and
- receive from each of the wireless devices, a response, wherein the response comprises:
- a plurality of first bits at a known bit rate and at least one unmodulated bit a fixed time after a last one of the plurality of first bits; and
- generate a stop processing indication upon detection of at least one of the at least one unmodulated bit.

* * * * *